United States Patent
Ichihara et al.

(10) Patent No.: US 8,653,519 B2
(45) Date of Patent: Feb. 18, 2014

(54) ELECTRONIC DEVICE AND METHOD FOR MANUFACTURING SAME

(75) Inventors: Tsutomu Ichihara, Osaka (JP); Kenji Tsubaki, Osaka (JP); Masao Kubo, Nara (JP); Nobuyoshi Koshida, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/582,611

(22) PCT Filed: Mar. 31, 2011

(86) PCT No.: PCT/JP2011/058264
§ 371 (c)(1),
(2), (4) Date: Sep. 4, 2012

(87) PCT Pub. No.: WO2011/125859
PCT Pub. Date: Oct. 13, 2011

(65) Prior Publication Data
US 2013/0032801 A1    Feb. 7, 2013

(30) Foreign Application Priority Data
Mar. 31, 2010   (JP) ................. 2010-083862

(51) Int. Cl.
*H01L 29/04*   (2006.01)
(52) U.S. Cl.
USPC ........................................... 257/49
(58) Field of Classification Search
CPC ........ B82Y 10/00; H01L 29/04; H01L 27/12; H01J 1/304; H01J 9/025; H01K 9/042
USPC ............ 257/10, 49, 72; 313/310, 311, 346 R; 445/24, 50, 51
See application file for complete search history.

(56) References Cited

U.S. PATENT DOCUMENTS

| 6,285,118 | B1 | 9/2001 | Hatai et al. |
| 6,590,321 | B1 | 7/2003 | Komoda et al. |
| 6,707,061 | B2 | 3/2004 | Komoda et al. |
| 6,765,342 | B1 | 7/2004 | Honda et al. |
| 6,791,248 | B2 | 9/2004 | Komoda et al. |
| 6,940,087 | B2 | 9/2005 | Komoda et al. |
| 2003/0020059 | A1 | 1/2003 | Komoda et al. |
| 2003/0197457 | A1 | 10/2003 | Komoda et al. |
| 2004/0195575 | A1 | 10/2004 | Komoda et al. |

FOREIGN PATENT DOCUMENTS

| JP | 2000-100316 | 4/2000 |
| JP | 2001-155622 | 6/2001 |
| JP | 2001-210224 | 8/2001 |
| JP | 2002-150927 | 5/2002 |
| JP | 2002-170487 | 6/2002 |
| JP | 2003-338619 | 11/2003 |
| JP | 2009-155112 | 7/2009 |

*Primary Examiner* — Nikolay Yushin
(74) *Attorney, Agent, or Firm* — Greenblum & Bernstein, P.L.C.

(57) ABSTRACT

The electronic device includes a substrate, a first electrode formed over a surface of the substrate, a second electrode located on an opposite side of the first electrode from the substrate so as to face the first electrode, and a functional layer interposed between the first electrode and second electrode and formed by means of anodizing a first polycrystalline semiconductor layer in an electrolysis solution so as to contain a plurality of semiconductor nanocrystals. The electronic device further includes a second polycrystalline semiconductor layer interposed between the first electrode and the functional layer so as to be in close contact with the functional layer. The second polycrystalline semiconductor layer has an anodic oxidization rate in the electrolysis solution lower than that of the first polycrystalline semiconductor layer so as to function as a stop layer for exclusively anodizing the first polycrystalline semiconductor layer.

9 Claims, 7 Drawing Sheets

ELECTRONIC DEVICE AND METHOD FOR MANUFACTURING SAME

TECHNICAL FIELD

The present invention relates to an electronic device including a functional layer containing semiconductor nanocrystals in a nanometer scale and a method for manufacturing the same.

BACKGROUND ART

In the past, there has been proposed an electronic device which includes a functional layer containing semiconductor nanocrystals (e.g., silicon nanocrystals) in a nanometer scale. Such a functional layer is formed by subjecting a polycrystalline semiconductor layer (e.g., a polycrystalline silicon layer) to anodic oxidization. An electron source and a light emitting device are examples of such an electronic device (see JP 2000-100316A, JP 2001-155622A, and JP 2003-338619A).

For example, such an electron source includes a substrate, a lower electrode (first electrode), a surface electrode (second electrode), and an intense electric field drift layer. The substrate is made of a glass substrate. The lower electrode (first electrode) is formed on a front surface of the substrate. The surface electrode (second electrode) is positioned away from the lower electrode over the front surface of the substrate, and faces the lower electrode. The intense electric field drift layer is interposed between the lower electrode and the surface electrode. The intense electric field drift layer is provided as a functional layer containing silicon nanocrystals. With regard to the electron source, when a predetermined voltage is applied between the surface electrode and the lower electrode while the surface electrode has a higher potential than the lower electrode, electrons are injected from the lower electrode, and drift through the intense electric field and then are emitted outside via the surface electrode. In this electron source, the surface electrode is a metal thin film constituted by one or more layers, or a laminated film including a carbon thin film and a metal thin film, for example. The surface electrode may have a thickness of about 10 nm.

In a fabrication process of the aforementioned intense electric field drift layer, first, a porous polycrystalline silicon layer is farmed by anodizing a polycrystalline silicon layer in an electrolysis solution (e.g., a hydrofluoric acid solution), and subsequently the resultant porous polycrystalline silicon layer is subjected to oxidization. Consequently, the intense electric field drift layer includes grains, first silicon dioxide films, a number of silicon nanocrystals in a nanometer scale, and second silicon dioxide films. The grain is shaped into a pillar and is made of polycrystalline silicon. The first silicon dioxide film is thin and is formed on a surface of the grain. The silicon nanocrystals are interposed between the adjacent grains. The second silicon dioxide film is formed on a surface of the silicon nanocrystal. The second silicon dioxide has a thickness less than a grain size (particle size) of the silicon nanocrystal.

In the aforementioned electron source, an electric field applied to the intense electric field drift layer mostly and intensively acts to the second silicon dioxide film on the surface of the silicon nanocrystal. Thus, injected electrons are accelerated by an intense electric field acting to the second silicon dioxide film. Then, the electrons drift toward the surface through a region between the adjacent grains. In brief, the intense electric field drift layer interposed between the lower electrode and the surface electrode serves as an electron transmitting layer configured to transmit electrons. Besides, the electron transmitting layer may be constituted by a part of the polycrystalline silicon layer used as a base of the intense electric field drift layer and the intense electric field drift layer.

Further, the aforementioned light emitting device includes a substrate, a lower electrode (first electrode), a surface electrode (second electrode), and a light emitting layer. The substrate is made of a glass substrate, for example. The lower electrode (first electrode) is formed on a front surface of the substrate. The surface electrode (second electrode) is positioned away from the lower electrode over the front surface of the substrate, and faces the lower electrode. The light emitting layer is interposed between the lower electrode and the surface electrode. The light emitting layer is provided as a functional layer containing silicon nanocrystals. With regard to the light emitting layer, when a predetermined voltage is applied between the surface electrode and the lower electrode, light produced by the light emitting layer is emitted outside via the surface electrode. The surface electrode has a specific thickness so as to transmit light.

In the manufacturing process of the electronic device such as the electron source and the light emitting device as mentioned above, the functional layer is formed by anodizing the polycrystalline semiconductor layer in the electrolysis solution. For example, a variation in the size of the crystalline grain of the polycrystalline semiconductor layer or a defect in the polycrystalline semiconductor causes a variation in depth to which the electrolysis solution penetrates the polycrystalline semiconductor layer from the surface of the polycrystalline semiconductor layer. As a result, the functional layer is likely to have an uneven thickness. This may cause uniformity of device performance and reproducibility. With regard to the electron source, the device performance is electron emission performance such as an emission current and electron emission efficiency. With regard to the light emitting device, the device performance is light emission performance. Further, when the polycrystalline semiconductor layer is locally anodized, the electrolysis solution may flow through the polycrystalline semiconductor layer. Such a flow of the electrolysis solution may cause separation of the polycrystalline semiconductor layer from the substrate. Hence, this may cause a decrease in a yield ratio.

SUMMARY OF INVENTION

In view of the above insufficiency, the present invention has aimed to propose an electronic device capable of improving its device performance relative to that of a prior electronic device and a method of manufacturing the same.

The first aspect of the electronic device in accordance with the present invention includes: a substrate; a first electrode formed over a surface of the substrate; a second electrode located on an opposite side of the first electrode from the substrate so as to face the first electrode; and a functional layer interposed between the first electrode and the second electrode, and formed by means of anodizing a first polycrystalline semiconductor layer in an electrolysis solution so as to contain a plurality of semiconductor nanocrystals. The electronic device further comprising a second polycrystalline semiconductor layer interposed between the first electrode and the functional layer so as to be in close contact with the functional layer. The second polycrystalline semiconductor layer has an anodic oxidization rate in the electrolysis solution lower than that of the first polycrystalline semiconductor layer so as to function as a stop layer for exclusively anodizing the first polycrystalline semiconductor layer.

In the second aspect of the electronic device in accordance with the present invention, in addition to the first aspect of the electronic device, the second polycrystalline semiconductor layer contains more electrons combinable with holes than the first polycrystalline semiconductor layer so as to function as the stop layer.

In the third aspect of the electronic device in accordance with the present invention, in addition to the first or second aspect of the electronic device, the second polycrystalline semiconductor layer has a doping concentration different from that of the first polycrystalline semiconductor layer so as to function as the stop layer.

In the fourth aspect of the electronic device in accordance with the present invention, in addition to the first aspect of the electronic device, the second polycrystalline semiconductor layer has a crystallization rate different from that of the first polycrystalline semiconductor layer so as to function as the stop layer.

In the fifth aspect of the electronic device in accordance with the present invention, in addition to the first aspect of the electronic device, a semiconductor material for forming the first polycrystalline semiconductor layer and the second polycrystalline semiconductor layer is silicon.

In the sixth aspect of the electronic device in accordance with the present invention, in addition to the first aspect of the electronic device, the functional layer is designed as an intense electric field drift layer configured to accelerate electrons injected from the first electrode towards the second electrode upon excited by an electric field. At least the first electrode, the second polycrystalline semiconductor layer, the functional layer, and the second electrode constitute an electron source element.

In the seventh aspect of the electronic device in accordance with the present invention, in addition to the first aspect of the electronic device, the functional layer is designed as a light emitting layer configured to emit light upon excited by an electric field. The first electrode, the second polycrystalline semiconductor layer, the functional layer, and the second electrode constitute a light emitting element.

The first aspect of the method for manufacturing an electronic device in accordance with the present invention is a method for manufacturing the second or third aspect of the electronic device, and includes a step depositing a third polycrystalline semiconductor layer used as a base for the second polycrystalline semiconductor layer over the surface of the substrate, and a step of injecting impurities into the third polycrystalline semiconductor layer by use of ion implantation to form the second polycrystalline semiconductor layer.

The second aspect of the method for manufacturing an electronic device in accordance with the present invention is a method for manufacturing the second or third aspect of the electronic device, and includes a step of forming the second polycrystalline semiconductor layer over the surface of the substrate by use of CVD.

BRIEF DESCRIPTION OF DRAWINGS

FIG. 1 shows a schematic cross sectional view (a) illustrating the electronic device of the first embodiment and a schematic configuration view (b) illustrating a primary part of the electronic device of the first embodiment, FIG. 4 shows a schematic cross sectional view (a) illustrating the electronic device of the second embodiment and a schematic configuration view (b) illustrating a primary part of the electronic device of the second embodiment, FIG. 6 shows a schematic cross sectional view (a) illustrating the electronic device of the third embodiment and a schematic configuration view (b) illustrating a primary part of the electronic device of the third embodiment.

DESCRIPTION OF EMBODIMENTS

First Embodiment

Figure 1:
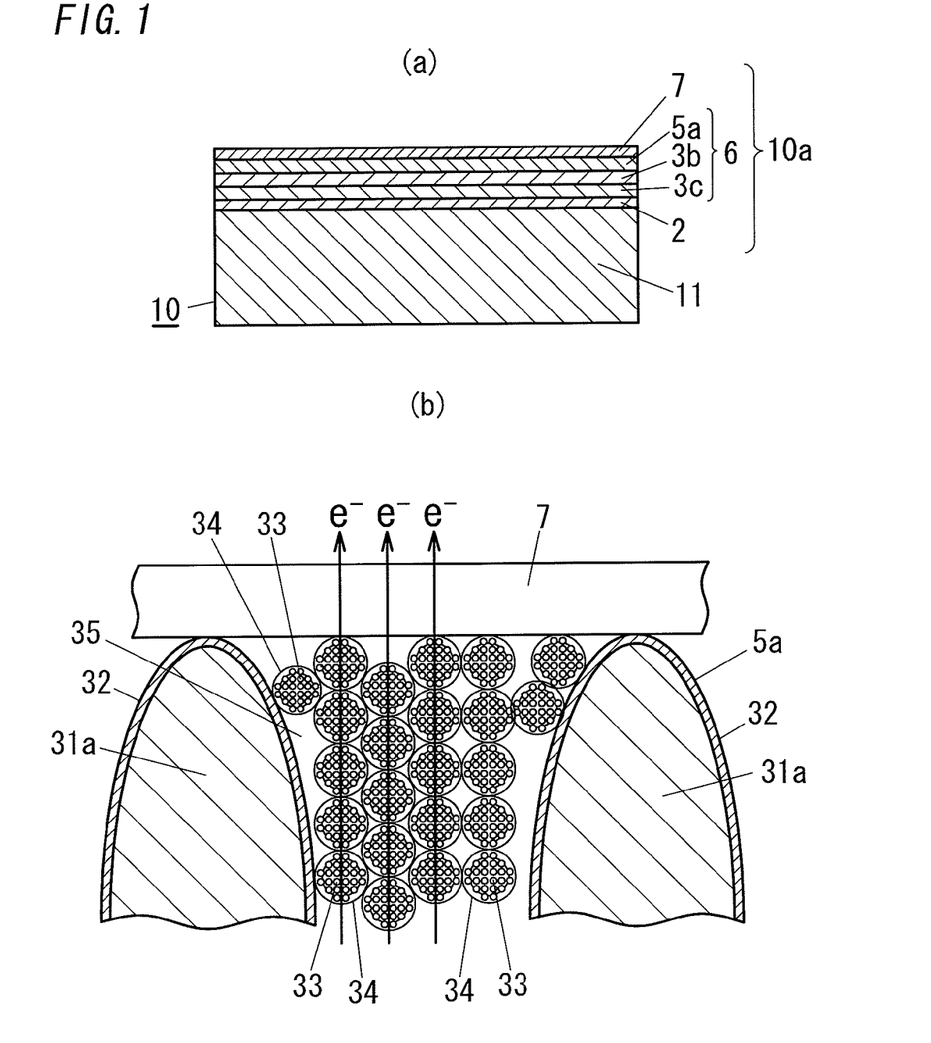

The following explanation referring FIG. 1 is made to the electronic device of the present embodiment.

Figure 3:
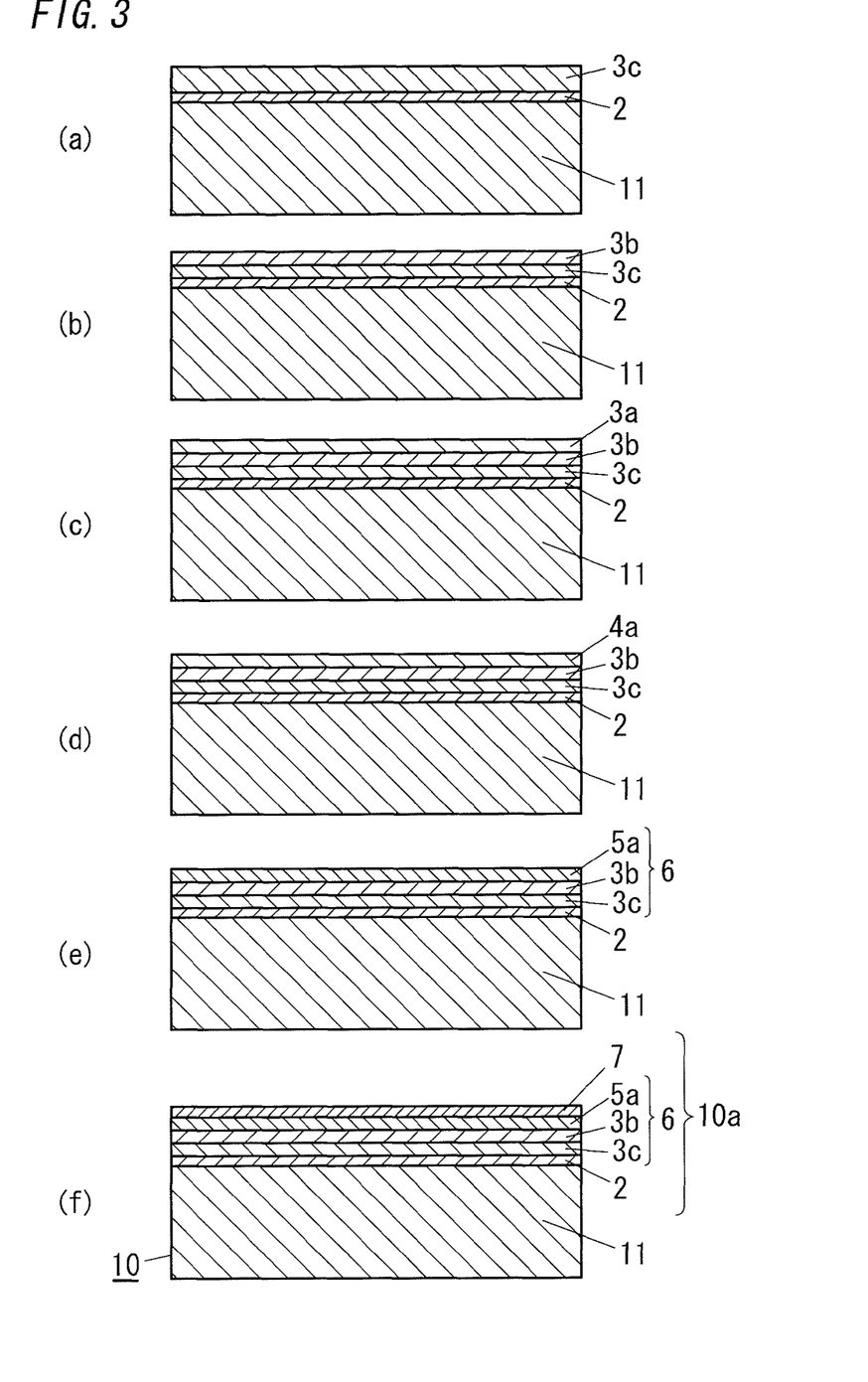
FIG. 3 shows cross sectional views illustrating primary steps of a method of manufacturing the above electronic device.

The electronic device includes a substrate 11, a lower electrode 2, a surface electrode 7, and a functional layer 5a. The lower electrode 2 is defined as a first electrode formed over a surface of the substrate 11. The surface electrode 7 is defined as a second electrode located on an opposite side of the lower electrode 2 from the substrate 11 so as to face the lower electrode 2. The functional layer 5a is interposed between the lower electrode 2 and the surface electrode 7, and is formed by means of anodizing a first polycrystalline semiconductor layer 3a (see FIG. (c)) in an electrolysis solution so as to contain plural semiconductor nanocrystals 33. Further, the electronic device includes a second polycrystalline semiconductor layer 3b. The second polycrystalline semiconductor layer 3b is interposed between the lower electrode 2 and the functional layer 5a so as to be in close contact with the functional layer 5a. The second polycrystalline semiconductor layer 3b has an anodic oxidization rate in the electrolysis solution lower than that of the first polycrystalline semiconductor layer 3a so as to function as a stop layer for exclusively (selectively) anodizing the first polycrystalline semiconductor layer 3a.

Moreover, this electronic device includes a third polycrystalline semiconductor layer 3c interposed between the second polycrystalline semiconductor layer 3b and the lower electrode 2. As explained below, the third polycrystalline semiconductor layer 3c is used as a base for the second polycrystalline semiconductor layer 3b.

The electronic device is designed as an electron source 10 configured to emit light based on field emission. The functional layer 5a is designed as an intense electric field drift layer configured to accelerate electrons injected from the lower electrode 2 towards the surface electrode 7 upon excited by an electric field. Further, in this electronic device, the lower electrode 2, the third polycrystalline semiconductor layer 3c, the second polycrystalline semiconductor layer 3b, the functional layer 5a, and the surface electrode 7 constitute an electron source element 10a. In brief, the third polycrystalline semiconductor layer 3c, the second polycrystalline semiconductor layer 3b, and the functional layer 5a constitute an electron transmitting layer 6 configured to allow electrons to pass therethrough. The surface electrode 7 has a thickness of 10 nm. This value is only one example of the thickness of the surface electrode 7, and the thickness of the surface electrode 7 is not limited to this value.

The substrate 11 is made of a glass substrate having electrically insulating properties. For example, the glass substrate can be selected from a non-alkali glass substrate and a quartz glass substrate. Alternatively, the substrate 11 may be made of a ceramic substrate with electrically insulating properties.

The lower electrode 2 is a metal layer made of a laminated film of a Ti film and a W film. The lower electrode 2 is not limited to such metal layer, but may be selected from a metal layer constituted by a single layer made of a metal material (e.g., metal such as Cr, W, Ti, Ta, Ni, Al, Cu, Au, Pt, and Mo; alloy; and intermetallic compound such as silicide) and or a metal layer constituted by multiple layers made of different metal materials (e.g., metal such as Cr, W, Ti, Ta, Ni, Al, Cu, Au, Pt, and Mo; alloy; and intermetallic compound such as silicide). Besides, the lower electrode 2 has a thickness of 300 nm. This value is only one example of the thickness of the lower electrode 2, and the thickness of the lower electrode 2 is not limited to this value.

The functional layer 5a is formed by subjecting the first polycrystalline semiconductor layer 3a (see FIG. 3 (c)) deposited on the second polycrystalline semiconductor layer 3b over the surface of the substrate 11 to anodic oxidation (a nanocrystallization process) followed by oxidization (an oxidization process). The functional layer 5a is formed by subjecting the first polycrystalline semiconductor layer 3a to the oxidization (oxidization treatment) after the anodic oxidization (anodic oxidization treatment) is performed until a part of the first polycrystalline semiconductor layer 3a in contact with the second polycrystalline semiconductor layer 3b is anodized. Preferably, a thickness of each of the second polycrystalline semiconductor layer 3b and the first polycrystalline semiconductor layer 3a is in a range of about 200 nm to 1000 nm.

Further, as shown in FIG. 1 (b), the functional layer 5a includes at least multiple grains 31a, first electrically insulating films 32, the plural semiconductor nanocrystals 33 in the nanometer scale, and second electrically insulating films 34. The grain 31a is formed extending along a thickness direction of the substrate 11. The first electrically insulating film 32 is thin and is formed on a surface of each grain 31a. The semiconductor nanocrystal 33 is interposed between the adjacent grains 31a. The second electrically insulating film 34 is formed on a surface of the semiconductor nanocrystal 33 and has a thickness less than a grain size (particle size) of the semiconductor nanocrystal 33. The functional layer 5a shows a mixture of the grains 31a and the multiple semiconductor nanocrystals 33 existing around a grain boundary between the adjacent grains 31a. Depending on a condition of the anodic oxidization, a region 35 which is a part of the functional layer 5a other than the grains 31a, the semiconductor nanocrystals 33, and each of the electrically insulating films 32 and 34 is a region constituted by amorphous semiconductor or a partially oxidized amorphous semiconductor, or a void.

In the present embodiment, the first polycrystalline semiconductor layer 3a and the second polycrystalline semiconductor layer 3b are made of a semiconductor material, and the semiconductor material is silicon. In other words, each of the first polycrystalline semiconductor layer 3a and the second polycrystalline semiconductor layer 3b is constituted by a polycrystalline silicon layer. Hence, the semiconductor nanocrystal 33 formed by subjecting the first polycrystalline semiconductor layer 3a to the anodic oxidization is a silicon nanocrystal. The grain 31a is a grain (crystal grain) of a polycrystalline silicon layer. Each of the first electrically insulating layer 33 and the second electrically insulating film 34 is constituted by a silicon dioxide film.

Further, in the present embodiment, the first polycrystalline semiconductor layer 3a is constituted by a non-doped polycrystalline silicon layer (i-layer: intrinsic layer). The second polycrystalline semiconductor layer 3b is constituted by an $n^+$-type polycrystalline silicon layer ($n^+$-region). In brief, the second polycrystalline semiconductor layer 3b is designed to contain more electrons combinable with holes than the first polycrystalline semiconductor layer 3a so as to function as the stop layer. Besides, a combination of the first polycrystalline semiconductor layer 3a and the second polycrystalline semiconductor layer 3b is a combination of an i-layer and an $n^+$-region. However, the combination of the first polycrystalline semiconductor layer 3a and the second polycrystalline semiconductor layer 3b is not limited to the above instance but may be selected from a combination of an n-region and an $n^+$-region, a combination of a p-region and an n-region, and a combination of a $p^+$-region and a $p^-$-region, for example. In these combinations, the second polycrystalline semiconductor layer 3b can function as the stop layer. In any case, the second polycrystalline semiconductor layer 3b which has a doping concentration different from that of the first polycrystalline semiconductor layer 3a can function as the stop layer.

Generally, the first polycrystalline semiconductor 3a has different anodic oxidization rates at different areas within its surface. In the anodic oxidization, when the formation of the first mixed layer 4a used as a base for the functional layer 5a progresses to the lowest part of the first polycrystalline semiconductor layer 3a, the stop layer has a function of reducing a supply amount of holes contributing to the anodic oxidization reaction at the deepest part of the first mixed layer 4a so as to prevent the formation of the first mixed layer 4a.

When the combination of the first polycrystalline semiconductor layer 3a and the second polycrystalline semiconductor layer 3b is a combination of an i-layer and an $n^+$-region, a light irradiation process is performed during the anodic oxidization. In this light irradiation process, holes generated at the deepest part of the first mixed layer 4a are combined with electrons supplied from the second polycrystalline semiconductor layer 3b. For this reason, it is considered that the formation of the first mixed layer 4a is prevented. When the combination of the first polycrystalline semiconductor layer 3a and the second polycrystalline semiconductor layer 3b is a combination of a p-region and an n-region or a combination of a $p^+$-region and $p^-$-region, the light irradiation process is not performed during the anodic oxidization and the anodic oxidization is performed under a condition in which outside light is blocked. With this instance, the second polycrystalline semiconductor layer 3b can act as the stop layer.

The surface electrode 7 is constituted by a metal thin film made of a metal material (e.g., Au). The metal material of the surface electrode 7 is not limited to Au, but may be a chemically stable metal material having relatively high electrical conductivity, a relatively low work function, and relatively high oxidization resistance. For example, Pt can be adopted as the metal material of the surface electrode 7. Further, the structure of the surface electrode 7 is not limited to a single layer structure, but may be a multilayer structure (a two-layer structure or a three-layer structure). When the surface electrode 7 has a multilayer structure, the surface electrode 7 may be constituted by a laminated film including metal thin films made of different metal materials, or a laminated film including a carbon thin film and a metal thin film.

Figure 2:
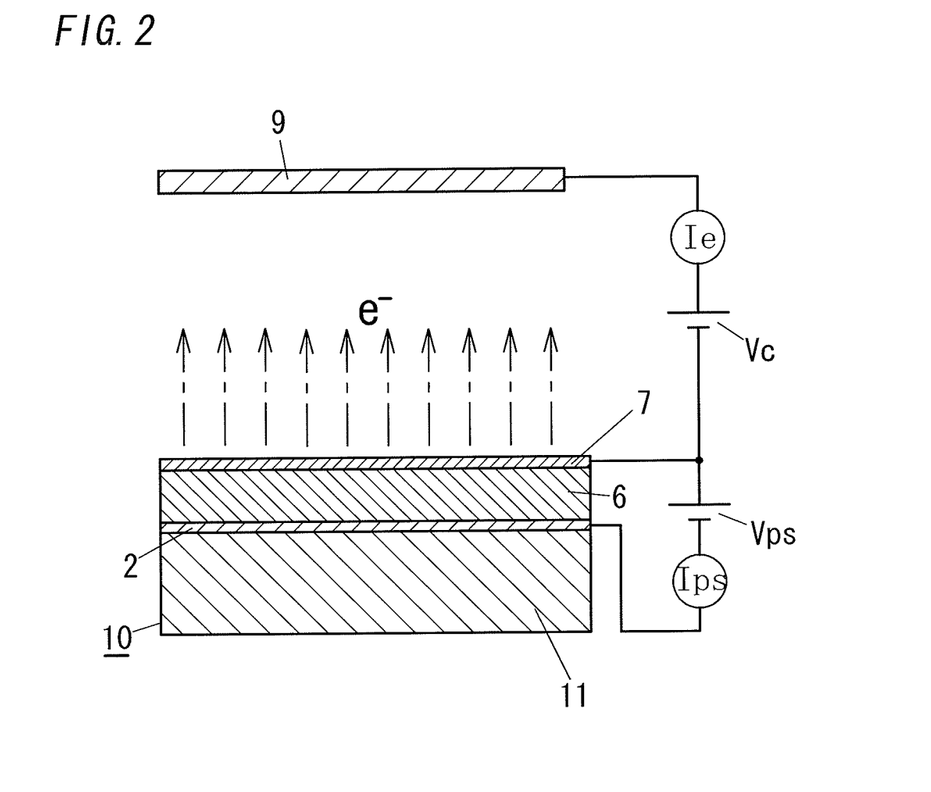
FIG. 2 is an explanation diagram illustrating an operation of the above electronic device.

The electron source element 10a shown in FIG. 1 (a) is operable to emit electrons through the following process. For example, as shown in FIG. 2, a collector electrode 9 is located facing the surface electrode 7. A vacuum space is formed between the surface electrode 7 and the collector electrode 9. A DC voltage Vps is applied between the surface electrode 7 and the lower electrode 2 such that the surface electrode 7 has a higher potential than that of the lower electrode 2, and a DC voltage Vc is applied between the collector electrode 9 and the surface electrode 7 such that the collector electrode 9 has a higher potential than that of the surface electrode 7. By appropriately setting the respective DC voltages Vps and Vc, electrons injected from the lower electrode 2 drift across the electron transmitting layer 6, and then emitted through the surface electrode 7. The one-dot chain lines in FIG. 2 indicate the flow of the electrons "e⁻" emitted through the surface electrode 7. The electrons reaching a front surface of the electron transmitting layer 6 can be considered as hot electrons. In brief, when the surface electrode 7 has a higher potential than the lower electrode 2, an electric field is developed and causes a quantum effect in the electron transmitting layer 6, and according to such a quantum effect, electrons are accelerated along a direction from the lower electrode 2 towards the surface electrode 7 and drift.

With regard to the electron source element 10a, a current flowing between the surface electrode 7 and the lower electrode 2 is referred to as a diode current Ips, and a current flowing between the collector electrode 9 and the surface electrode 7 is referred to as an emission current (emission electron current) Ie (see FIG. 2). In this electron source element 10a, electron emitting efficiency (=(Ie/Ips)×100 [%]) is increased with an increase in a ratio (=Ie/Ips) of the emission current Ie to the diode current Ips. Even if the DC voltage Vps applied between the surface electrode 7 and the lower electrode 2 is a relatively low voltage in a range of about 10 to 20 V, the electron source element 10a can emit electrons. The electron source element 10a has relatively low vacuum dependence of electron emission properties, and can stably emit electrons without occurrence of the popping phenomenon.

In principle, the electron source element 10a would emit electrons based on the following model. In order to make the electron source element 10a emit electrons, for example, the DC voltage Vps is applied between the surface electrode 7 and the lower electrode 2 such that the surface electrode 7 has a higher potential than that of the lower electrode 2, while the DC voltage Vc is applied between the collector electrode 9 and the surface electrode 7 such that the collector electrode 9 has a higher potential than that of the surface electrode 7. Consequently, electrons "e⁻" are injected into the electron transmitting layer 6 from the lower electrode 2. At the same time, the electric field caused by the DC voltage Vps applied to the electron transmitting layer 6 mostly acts to the second electrically insulating film 34. Thus, the injected electrons "e⁻" are accelerated by the intense electric field acting to the second electrically insulating film 34. Then, the electrons "e⁻" drift toward the surface electrode 7 in the direction (upper direction in FIG. 1 (*b*)) of the arrows in FIG. 1 (*b*) through the region between adjacent second grains 32a in the electron transmitting layer 6. When the DC voltage Vps is not less than a predetermined value (e.g., a voltage that the surface electrode 7 has a potential not less than a work function), the electrons "e⁻" which have reached the surface electrode 7 tunnel through the surface electrode 7 and are emitted from the surface electrode 7 to the vacuum space. As above, the electrons "e⁻" are accelerated by the intense electric field acting to the thin second electrically insulating film 34 on the surface of the semiconductor nanocrystal 33, and drift through the electron transmitting layer 6 while they are scarcely scattered by the semiconductor nanocrystals 33. Thereafter, the electrons "e⁻" are emitted to the vacuum space via the surface electrode 7. Further, heat generated at the electron transmitting layer 6 can be released through the grains 31a. Thus, during the electron emission, the electrons can be stably emitted without occurrence of the popping phenomenon. Since the electrons reaching the front surface of the electron transmitting layer 6 can be considered as hot electrons, they are emitted into the vacuum space after readily tunneling through the surface electrode 7. The electron source device 10a based on the operation principle as explained above is referred to as "Ballistic electron Surface-emitting Device". Moreover, with regard to this electron source element 10a, with applying the DC voltage Vps between the surface electrode 7 and the lower electrode 2 such that the surface electrode 7 has a higher electrical potential than that of the lower electrode 2, electrons can be injected into the electron transmitting layer 6 from the lower electrode 2. Hence, it is possible to successfully emit electrons in the atmosphere in addition to the vacuum.

The following explanation referring FIG. 3 is made to a method of manufacturing the electron source 10 defining the electronic device.

First, the lower electrode 2 having a first predetermined thickness (e.g., 300 nm) is formed on the surface of the substrate 11. Thereafter, the third polycrystalline semiconductor layer 3c having a second predetermined thickness is formed on the lower electrode 2. In the present embodiment, the second predetermined thickness is identical to a total thickness of the third polycrystalline semiconductor layer 3c and the second polycrystalline semiconductor layer 3b in FIG. 1 (*a*). For example, the second predetermined thickness is 1400 nm. As a result, a structure illustrated in FIG. 3 (*a*) is obtained. Besides, the lower electrode 2 is formed by use of sputtering or vapor deposition, for example. Further, the third polycrystalline semiconductor layer 3c can be formed by use of plasma CVD, but may be formed by use of LPCVD or thermal CVD.

After forming the aforementioned third polycrystalline semiconductor layer 3c, n-type impurities are implanted into the third polycrystalline semiconductor layer 3c via a front surface thereof by use of ion implantation. Subsequently, the third polycrystalline semiconductor layer 3c is subjected to activation annealing to form the second polycrystalline semiconductor layer 3b having a third predetermined thickness (e.g., 600 nm). As a result, a structure illustrated in FIG. 3 (*b*) is obtained. The second polycrystalline semiconductor layer 3b is formed by use of a part of the third polycrystalline semiconductor layer 3c. The thickness of the second polycrystalline semiconductor layer 3b can be adjusted to a desired thickness by means of controlling a condition (e.g., an acceleration voltage) of the ion plantation. Moreover, the impurity concentration can be adjusted to a desired concentration by means of controlling a dose amount.

After forming the second polycrystalline semiconductor layer 3b, the first polycrystalline semiconductor layer 3a having a fourth predetermined thickness (e.g., 600 nm) is formed on the second polycrystalline semiconductor layer 3b. As a result, a structure illustrated in FIG. 3 (*c*) is obtained. The first polycrystalline semiconductor layer 3a can be formed by use of plasma CVD. In this instance, a deposition temperature of plasma CVD is about 400° C. After deposition, annealing is performed at a predetermined annealing temperature (e.g., 550° C.) for predetermined annealing time (e.g., 2 hours) in order to remedy defect. Besides, the annealing temperature and the annealing time are not limited to the above values. Further, the annealing is not always necessary. Moreover, a deposition method of the first polycrystalline semiconductor layer 3a is not limited to plasma CVD, but may be LPCVD or thermal CVD.

After forming the first polycrystalline semiconductor layer 3a, the above anodic oxidization (nanocrystallization process) is performed to form the first mixed layer 4a containing the grains 31a (see FIG. 1 (b)) and the semiconductor nanocrystals 33 (see FIG. 1 (b)) of the first polycrystalline semiconductor layer 3a. As a result, a structure illustrated in FIG. 3 (d) is obtained. In the anodic oxidization, a treatment tank storing a predetermined electrolysis solution is used, and a constant current is flowed at first predetermined current density for first predetermined time by means of applying a voltage between a cathode electrode (not shown) constituted by a platinum electrode and the lower electrode 2, and then the first mixed layer 4a is formed. In the above anodic oxidization, the semiconductor material of the first polycrystalline semiconductor layer 3a is silicon, and then a hydrofluoric acid solution which is a mixture of a hydrogen fluoride solution with 55 wt % and ethanol in the ratio of about 1:1 is adopted as the electrolysis solution. The concentration of the hydrogen fluoride solution and the mixing ratio of the hydrogen fluoride solution and the ethanol are not limited to the above instances. A solution to be mixed with the hydrogen fluoride solution is not limited to the ethanol but may be alcohol such as methanol, propanol, and isopropanol (IPA). As long as bubbles generated due to the anodic oxidization reaction can be removed, the solution to be mixed with the hydrogen fluoride solution is not limited to a specific solution. The electrolysis solution may be appropriately selected from mixed solutions in accordance with the semiconductor material of the first polycrystalline semiconductor layer 3a. Besides, the anodic oxidization reaction is accelerated near the grain boundary between the adjacent grains 31a. Hence, the multiple semiconductor nanocrystals 33 are formed so that the semiconductor nanocrystals 33 are arranged in the thickness direction of the first polycrystalline semiconductor layer 3a.

In the anodic oxidization, the first predetermined current density is 12 mA/cm$^2$, and the first predetermined time (anodic oxidization time) is 15 seconds. However, these values are illustrative only, and the first predetermined current density and the first predetermined time are not limited to the above values. When the first predetermined current density is 12 mA/cm$^2$, the anodic oxidization rate of the first polycrystalline semiconductor layer 3a is in the range of about 42 nm/s to 50 nm/s. Since the second polycrystalline semiconductor layer 3b acts as the stop layer, the first mixed layer 4a can have the approximately same thickness as the first polycrystalline semiconductor layer 3a. Therefore, the functional layer 5a formed by subjecting the first mixed layer 4a to oxidization as mentioned below can have the approximately same thickness as the first polycrystalline semiconductor layer 3a. Hence, it is possible to improve uniformity of the thickness of the functional layer 5a. Further, in the present embodiment, the first polycrystalline semiconductor layer 3a is constituted by a non-doped polycrystalline silicon layer. Therefore, in the anodic oxidization, a current is flowed through the first polycrystalline semiconductor layer 3a while the first polycrystalline semiconductor layer 3a is irradiated with a light source (e.g., a tungsten lamp of 500 W).

After completion of the above anodic oxidization, the aforementioned oxidization (oxidization process) is performed to form the functional layer 5a. As a result, a structure illustrated in FIG. 3 (e) is obtained. In the oxidization, an oxidization treatment tank storing a predetermined electrolyte solution is used. For example, the electrolyte solution is a solution prepared by dissolving a solute (e.g., potassium nitrate) in an organic solvent (e.g., ethylene glycol) at a concentration of 0.04 mol/L. The first mixed layer 4a is immersed in the electrolyte solution, and then a constant current is flowed through the first mixed layer 4a at second predetermined current density by means of applying a predetermined voltage between an opposite electrode (not shown) constituted by a platinum electrode and the lower electrode 2. The first mixed layer 4a is electrochemically oxidized until a voltage between the opposite electrode and the lower electrode 2 is increased by a predetermined voltage. Thus, the functional layer 5a defined as a second mixed layer containing at least the grains 31a, the semiconductor nanocrystals 33, the first electrically insulating films 32, and the second electrically insulating films 34 is formed. As a result, the electron transmitting layer 6 constituted by the third polycrystalline semiconductor layer 3c, the second polycrystalline semiconductor layer 3b, and the functional layer 5a is formed. In the present embodiment, the second predetermined current density is 0.1 mA/cm$^2$, and the predetermined voltage is 20 V. However, these values are illustrative only, and the second predetermined current density and the predetermined voltage are not limited to the above values. Besides, a solution used in the oxidization is not limited to the aforementioned electrolysis solution, but may be a sulfuric acid aqueous solution of 1 M. Further, a kind of the solution used in the oxidization is not limited, and the solution may have an appropriate concentration. Further, in the oxidization, rapid thermal oxidization, plasma oxidization, or ozone oxidization may be adopted as an alternative to electrochemical oxidization, for example. Moreover, in order to improve denseness of each of electrically insulating films 32 and 34, the oxidization may include an annealing process subsequent to an oxidization process using electrochemical oxidization.

After forming the functional layer 5a, the surface electrode 7 having a fifth predetermined thickness (e.g., 10 nm) is formed on the functional layer 5a by use of vapor deposition (e.g., electron beam vapor deposition) or sputtering. As a result, the electron source 10 with a structure illustrated in FIG. 3 (f) is obtained. In the present embodiment, a laminated film of a Cu film and an Au film is selected as the surface electrode 7 in consideration of adhesion of the surface electrode 7 and the functional layer 5a, and electrical properties of the surface electrode 7, for example. However, the material and the laminated structure of the surface electrode 7 are not limited to the above instances.

According to the electronic device of the present embodiment as explained above, the second polycrystalline semiconductor layer 3b is interposed between the lower electrode 2 defined as the first electrode and the functional layer 5a. The second polycrystalline semiconductor layer 3b is also located underneath the functional layer 5a. The second polycrystalline semiconductor layer 3b is designed to function as the stop layer used for exclusively (selectively) anodizing the first polycrystalline semiconductor layer 3a. The stop layer has a lower anodic oxidization rate in the electrolyte solution than the first polycrystalline semiconductor layer 3a. Consequently, uniformity of the thickness of the functional layer 5a can be improved and also reproducibility can be enhanced. Hence, it is possible to prevent occurrence of pinholes in the electron transmitting layer 6. In addition, it is possible to improve a device performance and reproducibility of the electronic device. For example, the device performance is uniformity of the electron emission performance (e.g., an emission current and electron emission efficiency of the electron source 10). In brief, the electronic device of the present embodiment can have an improved performance relative to the prior electronic device.

Further, in the electronic device of the present embodiment, the second polycrystalline semiconductor layer 3b contains more electrons combinable with holes than the first polycrystalline semiconductor layer 3a so as to function as the stop layer at the anodic oxidization in the manufacturing process. In brief, with adjusting an electron concentration of the third polycrystalline semiconductor layer 3c relative to that of the first polycrystalline semiconductor layer 3a, it is possible to make the second polycrystalline semiconductor layer 3b function as the stop layer. Consequently, it is possible to enhance freedom to select a conductive type and a concentration of the first polycrystalline semiconductor layer 3a. It can be easy to design the second polycrystalline semiconductor layer 3b to function as the stop layer.

Further, in the electronic device of the present embodiment, the second polycrystalline semiconductor layer 3b has a doping concentration different from that of the first polycrystalline semiconductor layer 3a so as to function as the stop layer. With only adjusting the doping concentration, it is possible to design the second polycrystalline semiconductor layer 3b to function as the stop layer. Moreover, in the electronic device of the present embodiment, the semiconductor material of the first polycrystalline semiconductor layer 3a and the second polycrystalline semiconductor layer 3b is silicon. Consequently, it is possible to lower the production cost relative to an instance in which the first polycrystalline semiconductor layer 3a and the second polycrystalline semiconductor layer 3b are made of the other semiconductor material (e.g., germanium and compound semiconductor such as GaAs). In addition, it is possible to facilitate adjustment of the doping concentration.

Further, the method of manufacturing the aforementioned electronic device includes a step of forming the second polycrystalline semiconductor layer 3b. In this step, after the third polycrystalline semiconductor layer 3c which is used as a base for the second polycrystalline semiconductor layer 3b is deposited on the surface of the substrate 11, impurities are implanted into the third polycrystalline semiconductor layer 3c by use of ion plantation to form the second polycrystalline semiconductor layer 3b. Therefore, it is possible to facilitate the formation of the second polycrystalline semiconductor layer 3b configured to function as the stop layer. In addition, uniformity of the doping concentration of the second polycrystalline semiconductor layer 3b can be improved. Consequently, the uniformity of the thickness of the functional layer 5a as well as the reproducibility can be improved. Hence, it is possible to prevent occurrence of pinholes in the electron transmitting layer 6. In addition, it is possible to produce the electron source 10 with the improved device performance and the improved reproducibility. For example, the device performance is the uniformity of the electron emission performance (e.g., an emission current and electron emission efficiency of the electron source 10). In brief, the method of manufacturing the electronic device can produce the electronic device having the improved performance relative to the prior electronic device.

Besides, the structure of the electron source 10 defining the electronic device of the present embodiment is not limited to the structure illustrated in FIG. 1 (a). For example, the electron source 10 may have a structure in which a number of the electron source elements 10a are arranged on the surface of the substrate 11 in a matrix manner. Such a structure can be obtained by appropriately patterning the lower electrode 2, the surface electrode 7, and the electron transmitting layer 6, for example.

Second Embodiment

Figure 5:
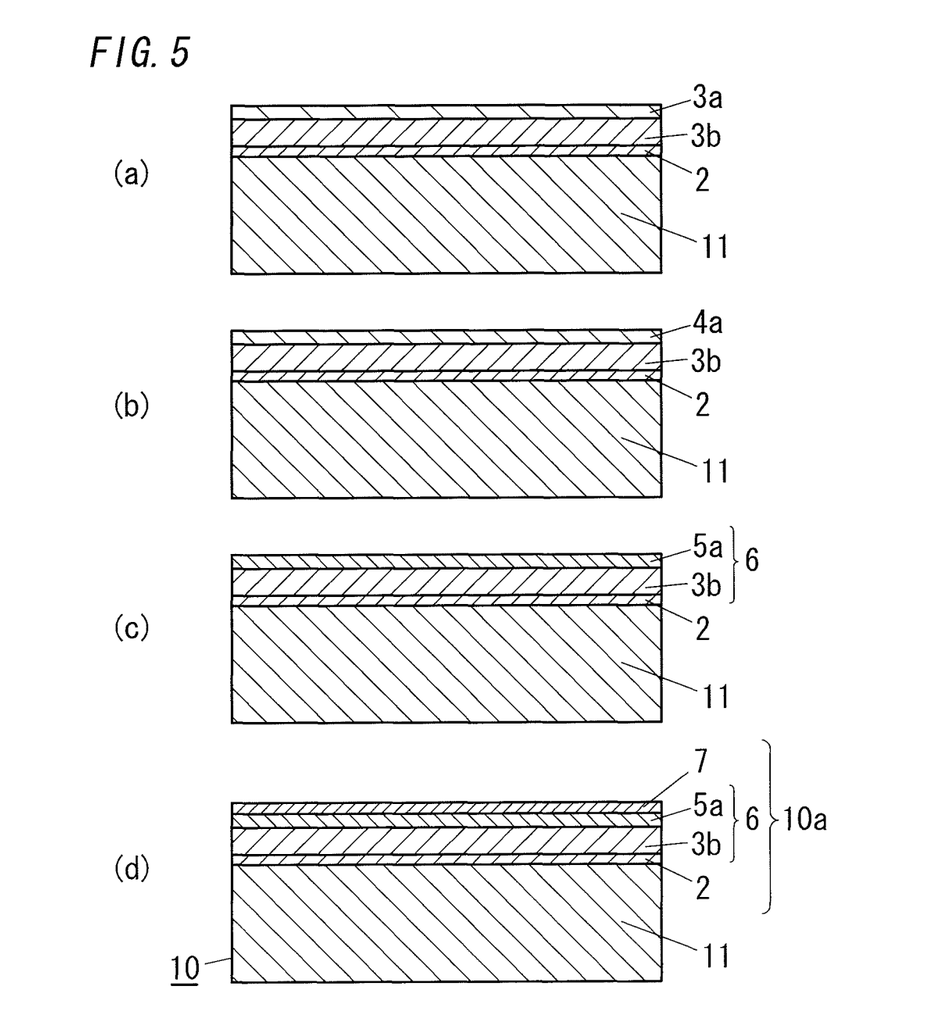
FIG. 5 shows cross sectional views illustrating primary steps of a method of manufacturing the above electronic device.

The electronic device of the present embodiment has the same basic configuration as the first embodiment. The electronic device of the present embodiment is different from the first embodiment in that the third polycrystalline semiconductor layer 3c (see FIG. 1 (a)) as explained in the first embodiment is not provided and the second polycrystalline semiconductor layer 3b is directly formed on the lower electrode 2, for example. Besides, components common to the present embodiment and the first embodiment are designated by the same reference numerals, and explanations thereof are deemed unnecessary The following explanation referring FIG. 5 is made to a method of manufacturing the electron source 10 defining the electronic device. However, explanations are not made to steps common to the manufacturing method of the present embodiment and the manufacturing method explained in the first embodiment.

First, the lower electrode 2 having the first predetermined thickness (e.g., 300 nm) is formed on the surface of the substrate 11. Thereafter, the second polycrystalline semiconductor layer 3b having the third predetermined thickness (e.g., 1400 nm) is formed on the lower electrode 2. Subsequently, the first polycrystalline semiconductor layer 3a having the fourth predetermined thickness (e.g., 600 nm) is formed on the second polycrystalline semiconductor layer 3b. As a result, a structure illustrated in FIG. 5 (a) is obtained. Besides, the lower electrode 2 is deposited by use of sputtering or vapor deposition, for example. Further, in a deposition process, the second polycrystalline semiconductor layer 3b and the first polycrystalline semiconductor layer 3a are formed by use of plasma CVD which is a kind of CVD, but may be formed by use of the other CVD (e.g., LPCVD, thermal CVD, and catalytic CVD). In the present embodiment, in the deposition process, each of the second polycrystalline semiconductor layer 3b and the first polycrystalline semiconductor layer 3a is doped with appropriate impurities at an appropriate concentration. Further, in the present embodiment, in a similar manner as the first embodiment, the first polycrystalline semiconductor layer 3a is constituted by a non-doped polycrystalline silicon layer (i-layer). The second polycrystalline semiconductor layer 3b is constituted by an $n^+$-type polycrystalline silicon layer ($n^+$-region). In brief, the combination of the first polycrystalline semiconductor layer 3a and the second polycrystalline semiconductor layer 3b is a combination of an i-layer and an $n^+$-region. However, the combination of the first polycrystalline semiconductor layer 3a and the second polycrystalline semiconductor layer 3b is not limited to the above instance but may be selected from a combination of an n-region and an $n^+$-region, a combination of a p-region and an n-region, and a combination of a $p^+$-region and a $p^-$-region, for example. In these combinations, the second polycrystalline semiconductor layer 3b can function as the stop layer. For example, the second polycrystalline semiconductor layer 3b and the first polycrystalline semiconductor layer 3a may be formed by use of plasma CVD. When each polycrystalline semiconductor layer is a polycrystalline silicon layer, a mixed gas (a $SiH_4$ gas diluted with a $H_2$ gas) of $SiH_4$ and $H_2$ can be adopted as a source gas. When a p-type impurity is boron, a $B_2H_6$ gas can be used as a dopant gas, for example. When an n-type impurity is phosphorus, a $PH_3$ gas can be used as a dopant gas, for example. Besides, the source gas and the dopant gas are not limited to the above examples. In addition, the deposition temperature in plasma CVD can be appropriately selected from a range of 100° C. to 600° C. The proper annealing process can be performed subsequent to the deposition process.

Figure 4:
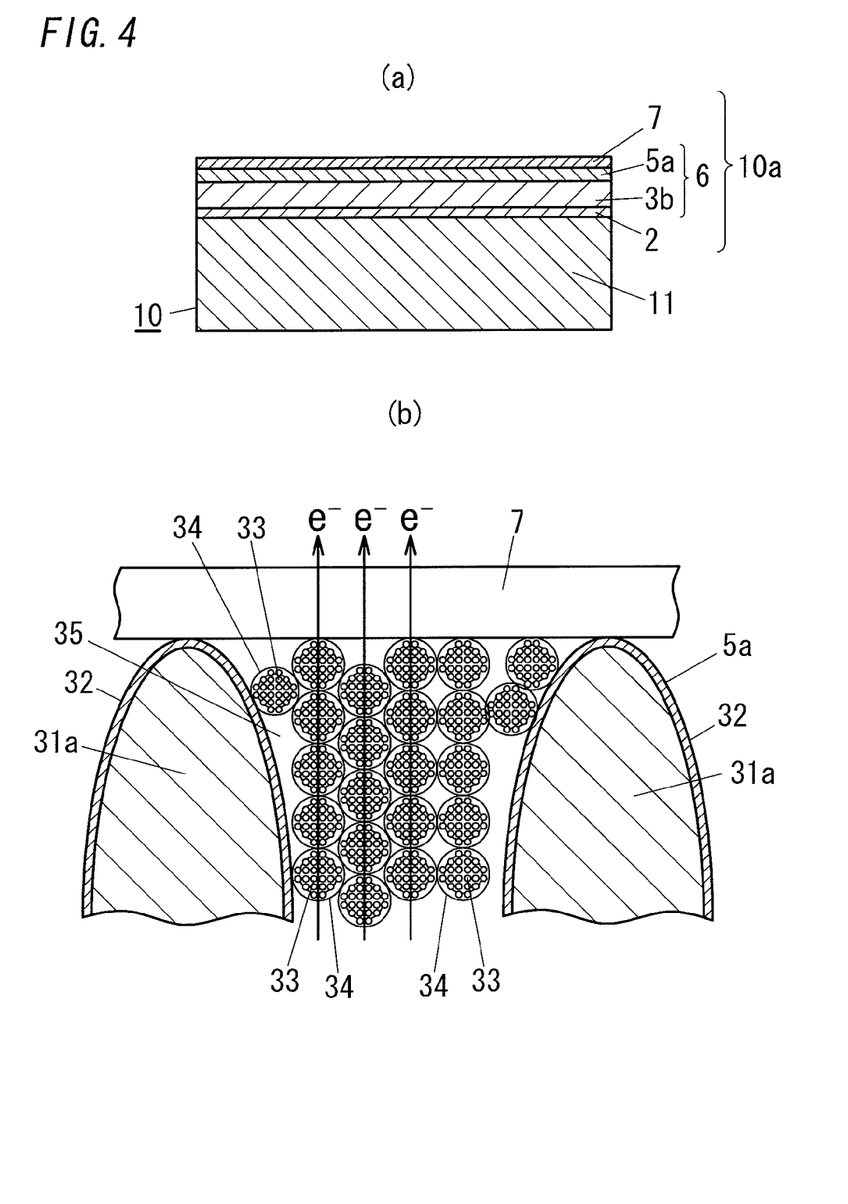

After forming the first polycrystalline semiconductor layer 3a, the above anodic oxidization (nanocrystallization process) is performed to form the first mixed layer 4a containing the grains 31a (see FIG. 4 (b)) and the semiconductor nanocrystals 33 (see FIG. 4 (b)) of the first polycrystalline semiconductor layer 3a. As a result, a structure illustrated in FIG. 5 (b) is obtained. Also in the anodic oxidization, the second polycrystalline semiconductor layer 3b acts as the stop layer as explained in the first embodiment. Therefore, it is possible to make the first mixed layer 4a have the approximately same thickness as the first polycrystalline semiconductor layer 3a. Therefore, the functional layer 5a formed by subjecting the first mixed layer 4a to oxidization as mentioned below can have the approximately same thickness as the first polycrystalline semiconductor layer 3a. Hence, it is possible to improve the uniformity of the thickness of the functional layer 5a. Further, in the present embodiment, the first polycrystalline semiconductor layer 3a is constituted by a non-doped polycrystalline silicon layer. Therefore, in the anodic oxidization, a current is flowed through the first polycrystalline semiconductor layer 3a while the first polycrystalline semiconductor layer 3a is irradiated with a light source (e.g., a tungsten lamp of 500 W).

After completion of the above anodic oxidization, the aforementioned oxidization (oxidization process) is performed to form the functional layer 5a. As a result, a structure illustrated in FIG. 5 (c) is obtained. Consequently, the electron transmitting layer 6 constituted by the second polycrystalline semiconductor layer 3b and the functional layer 5a is formed.

After forming the functional layer 5a, the surface electrode 7 having the fifth predetermined thickness (e.g., 10 nm) is formed on the functional layer 5a by use of vapor deposition (e.g., electron beam vapor deposition) or sputtering. As a result, the electron source 10 with a structure illustrated in FIG. 5 (d) is obtained.

According to the electronic device of the present embodiment as explained above, in a similar manner as the first embodiment, the second polycrystalline semiconductor layer 3b is interposed between the lower electrode 2 acting as the first electrode and the functional layer 5a, and is located underneath the functional layer 5a. The second polycrystalline semiconductor layer 3b is designed to have the anodic oxidization rate in the electrolysis solution lower than that of the first polycrystalline semiconductor layer 3a so as to function as the stop layer enabling exclusively (selectively) anodizing the first polycrystalline semiconductor layer 3a. Consequently, the uniformity of the thickness of the functional layer 5a as well as the reproducibility can be improved. Hence, it is possible to prevent occurrence of pinholes in the electron transmitting layer 6. In addition, it is possible to improve the device performance and the reproducibility of the electronic device. For example, the device performance is the uniformity of the electron emission performance (e.g., an emission current and electron emission efficiency of the electron source 10).

Further, also in the electronic device of the present embodiment, in a similar manner as the first embodiment, the second polycrystalline semiconductor layer 3b contains more electrons combinable with holes than the first polycrystalline semiconductor layer 3a so as to function as the stop layer in the anodic oxidization of the manufacturing process. In brief, with adjusting an electron concentration of the second polycrystalline semiconductor layer 3b relative to that of the first polycrystalline semiconductor layer 3a, it is possible to make the second polycrystalline semiconductor layer 3b function as the stop layer. Consequently, it is possible to enhance the freedom to select a conductive type and a concentration of the first polycrystalline semiconductor layer 3a. It can be easy to design the second polycrystalline semiconductor layer 3b to function as the stop layer.

Further, the method of manufacturing the aforementioned electronic device includes a step of forming the second polycrystalline semiconductor layer 3b. In this step, the second polycrystalline semiconductor layer 3b is formed on the surface of the substrate 11 by use of CVD. Therefore, it is possible to facilitate the formation of the second polycrystalline semiconductor layer 3b configured to function as the stop layer. In addition, the uniformity of the doping concentration of the second polycrystalline semiconductor layer 3b can be improved. Consequently, the uniformity of the thickness of the functional layer 5a as well as the reproducibility can be improved. Hence, it is possible to prevent occurrence of pinholes in the electron transmitting layer 6. In addition, it is possible to produce the electron source 10 with the improved device performance and the improved reproducibility. For example, the device performance is the uniformity of the electron emission performance (e.g., an emission current and electron emission efficiency). According to the present embodiment, in the deposition process of the second polycrystalline semiconductor layer 3b by use of CVD, the second polycrystalline semiconductor layer 3b is doped with appropriate impurities. Hence, in contrast to an instance in which the second polycrystalline semiconductor layer 3b is formed through a CVD process as well as an ion plantation process as explained in the first embodiment, it is possible to simplify the manufacturing process, and thus to manufacture the electronic device at lowered cost. In addition, the limitation of the material of the substrate 11 due to the heatproof temperature of the substrate 11 can be eased. Further, when the second polycrystalline semiconductor layer 3b and the first polycrystalline semiconductor layer 3a can be deposited continuously in the same chamber of a CVD device, it is possible to shorten manufacturing time and thus to manufacture the electronic device at lowered cost. When the first polycrystalline semiconductor layer 3a is constituted by a non-doped polycrystalline silicon layer, the quality of the first polycrystalline semiconductor layer 3a is likely to be deteriorated by contamination caused by the dopant gas used for forming the second polycrystalline semiconductor layer 3b. In consideration of this disadvantage, a multi-chamber CVD device including a first chamber for deposition of the second polycrystalline semiconductor layer 3b and a second chamber for deposition of the first polycrystalline semiconductor layer 3a can be used. With using this multi-chamber CVD device, it is possible to reduce the bad effect caused by the contamination. Hence, the quality of the first polycrystalline semiconductor layer 3a as well as the reproducibility of the quality thereof can be improved.

Alternatively, the second polycrystalline semiconductor layer 3b may have a crystallization rate different from that of the first polycrystalline semiconductor layer 3a so as to function as the stop layer. With controlling the crystallization rate, it is possible to differentiate the crystallization rate of the second polycrystalline semiconductor layer 3b from the crystallization rate of the first polycrystalline semiconductor layer 3a. The crystallization rate can be adjusted to a desired value by changing the deposition condition (process parameters) appropriately. For example, the crystallization rate is increased with an increase in an amount of the $H_2$ gas for diluting the $SiH_4$ (i.e., $H_2/(SiH_4+H_2)$). In addition, the crystallization rate is increased with an increase in the substrate temperature. Moreover, the crystallization rate is increased with an increase in power. Further, the crystallization rate is increased with an increase in the annealing temperature of the annealing process subsequent to the deposition process. When the second polycrystalline semiconductor layer 3b is formed to have a crystallization rate different from that of the first polycrystalline semiconductor layer 3a so as to function as the stop layer, it is unnecessary to dope the first polycrystalline semiconductor layer 3a and the second polycrystalline semiconductor layer 3b with impurities. Hence, the electronic device can be fabricated more easily.

Besides, the structure of the electron source 10 defining the electronic device of the present embodiment is not limited to the structure illustrated in FIG. 4 (a). For example, the electron source 10 may have a structure in which a number of the electron source elements 10a are arranged on the surface of the substrate 11 in a matrix manner. Such a structure can be obtained by appropriately patterning the lower electrode 2, the surface electrode 7, and the electron transmitting layer 6, for example.

Third Embodiment

The present embodiment shows a light emitting device configured to emit light based on a quantum effect caused by electric field excitation, as an example of the electronic device.

Figure 6:
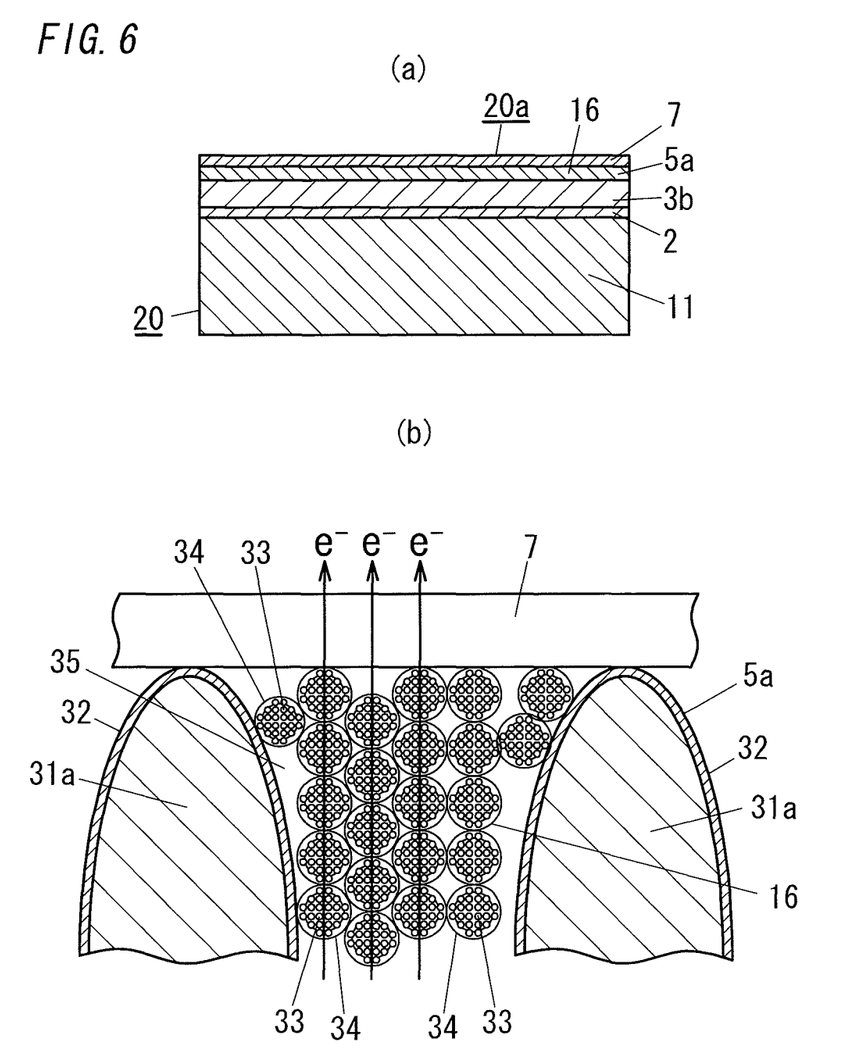

The light emitting device 20 of the present embodiment as illustrated in FIG. 6 (a) has the approximately same basic configuration as the electron source 10 of the second embodiment. The light emitting device 20 of the present embodiment is different from the electron source 10 of the second embodiment in that the functional layer 5a interposed between the lower electrode 2 and the surface electrode 7 acts as a light emitting layer 16 and the surface electrode 7 is designed to transmit light emitted from the light emitting layer 16. Besides, components common to the present embodiment and the second embodiment are designated by the same reference numerals, and explanations thereof are deemed unnecessary For example, the surface electrode 7 is constituted by a transparent conductive film. The transparent conductive film may be made of an indium oxide material (a material containing indium as a matrix) such as ITO and IZO, a zinc oxide material (a material containing zinc as a matrix) such as AZO and GZO, or a tin oxide material (a material containing tin as a matrix) such as FTO and ATO.

Further, the surface electrode 7 may be constituted by a transparent thin film The transparent thin film is a metal thin film having a thickness not greater than 10 nm, for example. Such a metal thin film is selected from an Au film and a Ti film, for example.

In order to make the light emitting device 20 emit light, it is sufficient that a voltage is applied between the surface electrode 7 and the lower electrode 2. When a voltage is applied between the surface electrode 7 and the lower electrode 2, an electric field acts to the light emitting layer 16 constituted by the functional layer 5a, and then the quantum effect is caused so that the light emitting layer 16 produces light. The light produced by the light emitting layer 16 is emitted outside through the surface electrode 7. In brief, the lower electrode 2, the second polycrystalline semiconductor layer 3b, the functional layer 5a, and the surface electrode 7 constitute a light emitting element 20a.

Figure 7:
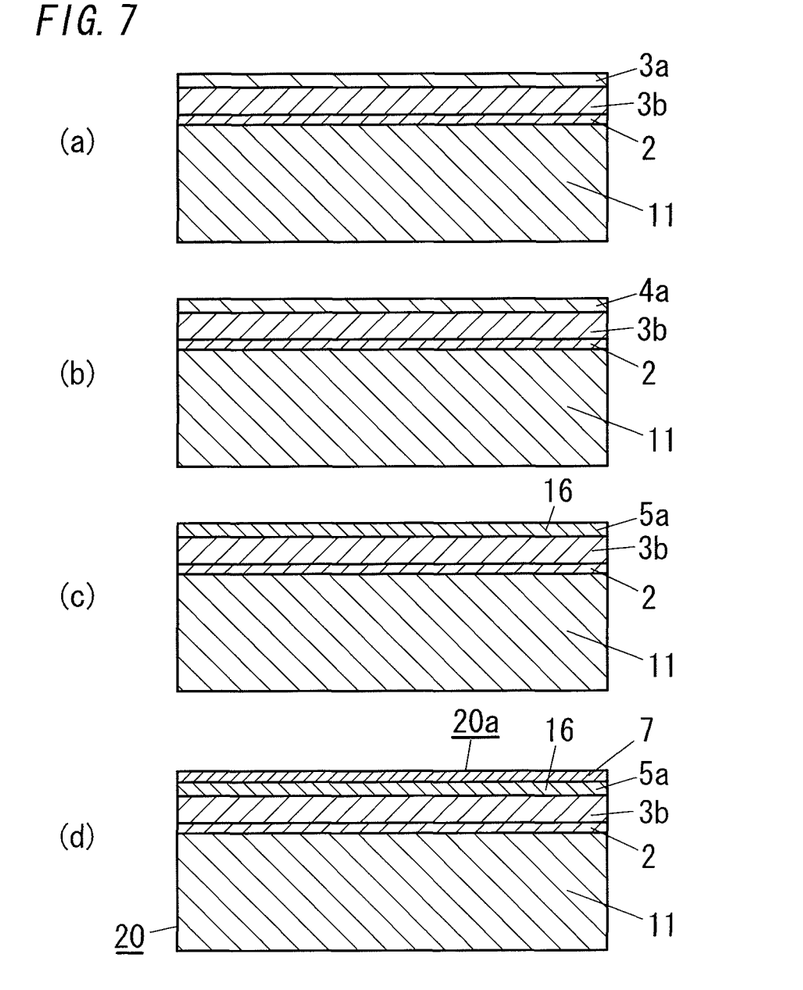
FIG. 7 shows cross sectional views illustrating primary steps of a method of manufacturing the above electronic device.

The following explanation referring FIG. 7 is made to a method of manufacturing the light emitting device 20 defining the electronic device. However, explanations are not made to steps common to the manufacturing method of the present embodiment and the manufacturing method explained in the second embodiment.

First, the lower electrode 2 having the first predetermined thickness (e.g., 300 nm) is formed on the surface of the substrate 11. Thereafter, the second polycrystalline semiconductor layer 3b having the third predetermined thickness (e.g., 1400 nm) is formed on the lower electrode 2. Subsequently, the first polycrystalline semiconductor layer 3a having the fourth predetermined thickness (e.g., 600 nm) is formed on the second polycrystalline semiconductor layer 3b. As a result, a structure illustrated in FIG. 7 (a) is obtained. Besides, the second polycrystalline semiconductor layer 3b and the first polycrystalline semiconductor layer 3a are formed by use of plasma CVD which is a kind of CVD, but may be formed by use of the other CVD (e.g., LPCVD, thermal CVD, and catalytic CVD). In the present embodiment, in the deposition process, each of the second polycrystalline semiconductor layer 3b and the first polycrystalline semiconductor layer 3a is doped with appropriate impurities at an appropriate concentration. Further, in the present embodiment, in a similar manner as the second embodiment, the first polycrystalline semiconductor layer 3a is constituted by a non-doped polycrystalline silicon layer (i-layer). In brief, the combination of the first polycrystalline semiconductor layer 3a and the second polycrystalline semiconductor layer 3b is a combination of an i-layer and an $n^+$-region. However, the combination of the first polycrystalline semiconductor layer 3a and the second polycrystalline semiconductor layer 3b is not limited to the above instance but may be selected from a combination of an n-region and an $n^+$-region, a combination of a p-region and an n-region, and a combination of a $p^+$-region and a $p^-$-region, for example. In these combinations, the second polycrystalline semiconductor layer 3b can function as the stop layer.

After forming the first polycrystalline semiconductor layer 3a, the above anodic oxidization (nanocrystallization process) is performed to form the first mixed layer 4a containing the grains 31a (see FIG. 6 (b)) and the semiconductor nanocrystals 33 (see FIG. 6 (b)) of the first polycrystalline semiconductor layer 3a. As a result, a structure illustrated in FIG. 7 (b) is obtained. Also in the anodic oxidization, the second polycrystalline semiconductor layer 3b acts as the stop layer as explained in the second embodiment. Therefore, it is possible to make the first mixed layer 4a have the approximately same thickness as the first polycrystalline semiconductor layer 3a. Therefore, the functional layer 5a formed by subjecting the first mixed layer 4a to oxidization as mentioned below can have the approximately same thickness as the first polycrystalline semiconductor layer 3a. Hence, it is possible to improve the uniformity of the thickness of the functional layer 5a. Further, in the present embodiment, the first polycrystalline semiconductor layer 3a is constituted by a non-doped polycrystalline silicon layer. Therefore, in the anodic oxidization, a current is flowed through the first polycrystalline semiconductor layer 3a while the first polycrystalline semiconductor layer 3a is irradiated with a light source (e.g., a tungsten lamp of 500 W).

After completion of the above anodic oxidization, the aforementioned oxidization (oxidization process) is performed to form the functional layer 5a. As a result, a structure illustrated in FIG. 7 (c) is obtained. Consequently, the light emitting layer 16 constituted by the functional layer 5a is formed.

After forming the functional layer 5a, the surface electrode 7 having the fifth predetermined thickness (e.g., 10 nm) is formed on the functional layer 5a by use of sputtering or vapor deposition. As a result, the light emitting device 20 with a structure illustrated in FIG. 7 (d) is obtained.

According to the electronic device of the present embodiment as explained above, in a similar manner as the second embodiment, the second polycrystalline semiconductor layer 3b is interposed between the lower electrode 2 defined as the first electrode and the functional layer 5a, and is located underneath the functional layer 5a. The second polycrystalline semiconductor layer 3b is designed to have the anodic oxidization rate in the electrolysis solution lower than that of the first polycrystalline semiconductor layer 3a so as to function as the stop layer enabling exclusively (selectively) anodizing the first polycrystalline semiconductor layer 3a. Consequently, the uniformity of the thickness of the functional layer 5a as well as the reproducibility can be improved. Hence, it is possible to prevent occurrence of pinholes in a laminated structure part constituted by the light emitting layer 16 and the second polycrystalline semiconductor layer 3b. In addition, it is possible to improve the device performance and the reproducibility of the electronic device. For example, the device performance is uniformity of light emitting performance (e.g., brightness of the light emitting device 20).

Further, also in the electronic device of the present embodiment, in a similar manner as the second embodiment, the second polycrystalline semiconductor layer 3b contains more electrons combinable with holes than the first polycrystalline semiconductor layer 3a so as to function as the stop layer in the anodic oxidization of the manufacturing process. In brief, with appropriately adjusting a relative electron concentration of the second polycrystalline semiconductor layer 3b to the first polycrystalline semiconductor layer 3a, it is possible to make the second polycrystalline semiconductor layer 3b function as the stop layer. Consequently, it is possible to enhance the freedom to select a conductive type and a concentration of the first polycrystalline semiconductor layer 3a. It can be easy to design the second polycrystalline semiconductor layer 3b to function as the stop layer.

Further, the method of manufacturing the aforementioned electronic device includes a step of forming the second polycrystalline semiconductor layer 3b. In this step, the second polycrystalline semiconductor layer 3b is formed on the surface of the substrate 11 by use of CVD. Therefore, it is possible to facilitate the formation of the second polycrystalline semiconductor layer 3b configured to function as the stop layer. In addition, the uniformity of the doping concentration of the second polycrystalline semiconductor layer 3b can be improved. Consequently, the uniformity of the thickness of the functional layer 5a as well as the reproducibility can be improved. Hence, it is possible to prevent occurrence of pinholes in the laminated structure part constituted by the light emitting layer 16 and the second polycrystalline semiconductor layer 3b. In addition, it is possible to produce the light emitting device 20 with the improved device performance and the improved reproducibility. For example, the device performance is the uniformity of the light emitting performance (e.g., brightness).

Besides, the light emitting layer 16 need not include each of the electrically insulating films 32 and 34. When the light emitting layer 16 is devoid of each of the electrically insulating films 32 and 34, the above oxidization can be omitted. In this modification, the first mixed layer 4a acts as the functional layer 5a as well as the light emitting layer 16. Further, in a similar manner as the electron source element 10a (see FIG. 1 (a)) of the first embodiment, the light emitting element 20a of the light emitting device 20 may be designed to have the third polycrystalline semiconductor layer 3c interposed between the second polycrystalline semiconductor layer 3b and the lower electrode 2.

In each embodiment, each of the electrically insulating films 32 and 34 of the functional layer 5a is constituted by a silicon dioxide film, but may be constituted by a silicon nitride film or a silicon oxynitride film instead of a silicon dioxide film. In this modification, nitriding treatment (nitriding process) or oxynitriding treatment (oxynitriding treatment) is adopted instead of the above oxidization treatment (oxidization process). In brief, each of the electrically insulating films 32 and 34 may be made of oxide, nitride, or oxynitride of the semiconductor material of the first polycrystalline semiconductor layer 3a.

The invention claimed is:

1. An electronic device, comprising:
 a substrate;
 a first electrode formed over a surface of said substrate;
 a second electrode located on an opposite side of said first electrode from said substrate so as to face said first electrode; and
 a functional layer interposed between said first electrode and said second electrode, and formed by anodizing a first polycrystalline semiconductor layer in an electrolysis solution so as to contain a plurality of semiconductor nanocrystals,
 wherein said electronic device further comprises a second polycrystalline semiconductor layer interposed between said first electrode and said functional layer so as to be in close contact with said functional layer, said second polycrystalline semiconductor layer having an anodic oxidization rate in the electrolysis solution lower than that of said first polycrystalline semiconductor layer so as to function as a stop layer for exclusively anodizing said first polycrystalline semiconductor layer,
 said second polycrystalline semiconductor layer contains more electrons combinable with holes than said first polycrystalline semiconductor layer so as to function as said stop layer, and
 a combination of said first polycrystalline semiconductor layer and said second polycrystalline semiconductor layer is selected from a combination of an n-region and an $n^+$-region, a combination of a p-region and an n-region, and a combination of a $p^+$-region and a $p^-$-region.

2. An electronic device as set forth in claim 1, wherein a semiconductor material for forming said first polycrystalline semiconductor layer and said second polycrystalline semiconductor layer is silicon.

3. An electronic device as set forth in claim 1, wherein said functional layer is designed as an intense electric field drift layer configured to accelerate electrons injected from said first electrode towards said second electrode upon excitation by an electric field, and
 at least said first electrode, said second polycrystalline semiconductor layer, said functional layer, and said second electrode constitute an electron source element.

4. An electronic device as set forth in claim 1, wherein said functional layer is designed as a light emitting layer configured to emit light upon excitation by an electric field, and
 said first electrode, said second polycrystalline semiconductor layer, said functional layer, and said second electrode constitute a light emitting element.

5. An electronic device as set forth in claim 1, further comprising:
 a third polycrystalline semiconductor layer between said second polycrystalline semiconductor layer and said substrate,
 wherein said third polycrystalline semiconductor layer is a base for said second polycrystalline semiconductor layer, and
 said second polycrystalline semiconductor layer is formed by injecting impurities into said third polycrystalline semiconductor layer by use of ion implantation.

6. An electronic device as set forth in claim 1, wherein
said second polycrystalline semiconductor layer is formed over said surface of said substrate by use of chemical vapor deposition.

7. An electronic device as set forth in claim 1, wherein
said second polycrystalline semiconductor layer has a doping concentration different from that of said first polycrystalline semiconductor layer so as to function as said stop layer.

8. An electronic device as set forth in claim 7, further comprising:
a third polycrystalline semiconductor layer between said second polycrystalline semiconductor layer and said substrate,
wherein said third polycrystalline semiconductor layer is a base for said second polycrystalline semiconductor layer, and
said second polycrystalline semiconductor layer is formed by injecting impurities into said third polycrystalline semiconductor layer by use of ion implantation.

9. An electronic device as set forth in claim 7, wherein
said second polycrystalline semiconductor layer is formed over said surface of said substrate by use of chemical vapor deposition.

* * * * *